United States Patent [19]

Fuss et al.

[11] Patent Number: 4,721,048
[45] Date of Patent: Jan. 26, 1988

[54] TRASH SEEDER

[76] Inventors: Roy M. Fuss, 21 Leslie Street; Eric W. Fuss, 3 Heller Street; Jarvis R. Fuss, 143 Tourist Road, all of Toowoomba, Queensland, Australia, 4350

[21] Appl. No.: 790,073

[22] Filed: Oct. 22, 1985

[30] Foreign Application Priority Data

Oct. 29, 1984 [AU] Australia .................. PG7893

[51] Int. Cl.[4] .................................. A01C 5/00
[52] U.S. Cl. .......................... 111/85; 172/176; 172/500; 172/501; 172/464
[58] Field of Search ........... 172/488, 464, 491, 260.5, 172/707, 497, 500, 472, 462, 265, 489, 176, 175, 501; 111/85, 67, 52, 86

[56] References Cited

U.S. PATENT DOCUMENTS

| | | | |
|---|---|---|---|
| 771,485 | 10/1904 | Meyers | 111/67 |
| 2,554,061 | 5/1951 | Sanberg | 111/85 |
| 2,694,356 | 11/1954 | Haas | 111/85 X |
| 2,829,578 | 4/1958 | Brown | 111/85 |
| 3,439,749 | 4/1969 | Olsson | 172/707 |
| 3,568,613 | 3/1971 | Lange | 111/86 |
| 3,799,079 | 3/1974 | Dietrich | 111/7 |
| 4,311,104 | 1/1982 | Steilen | 111/86 |
| 4,426,940 | 1/1984 | Brain | 111/7 |
| 4,506,609 | 3/1985 | Fuss | 111/52 |
| 4,574,715 | 3/1986 | Dietrich | 111/7 |

*Primary Examiner*—Richard J. Johnson
*Attorney, Agent, or Firm*—Wm. T. Wofford; James C. Fails; Arthur F. Zobal

[57] ABSTRACT

The invention is directed to a trash seeder having a seeding tyne and a following press wheel. A hydraulic cylinder applies pressure to both the seeding tyne and the press wheel. The press wheel is pivoted to the frame by a trailing arm and the tyne is pivoted to the trailing arm, the hydraulic cylinder acting on the tyne. Thus the single hydraulic cylinder applies pressure to both tyne and wheel, while allowing the tyne to move upwardly over obstructions without effecting operation of the press wheel.

9 Claims, 2 Drawing Figures

TRASH SEEDER

This invention relates to trash seeders, more particularly a trash seeder in which the cultivating tyne can have a stump jump action, while the press wheel is maintained in contact with the soil.

BACKGROUND OF THE INVENTION

In our earlier Australian Patent specification No. 542,978 there is described a planter unit attached to the rear bar of a cultivator. The tyne depth is adjustable, with a depth of penetration being controlled by a compaction wheel.

However with changing farming techniques, there developed a need for a more specialised seeding machine for seeding into trash with minimum or no tillage to conventional tillage leaving maximum trash on top of the soil. Reference is also made to our earlier Australian Pat. No. 544,879 (U.S. Pat. No. 4,506,609) for an improved trash seeder.

As most farmers are now using minimum or full tillage methods but leaving a maximum amount of trash on the surface, it has been found that a leading coulter is not required.

However in Australian Pat. No. 544,879 (U.S. Pat. No. 4,506,609) the frame of the machine is carried on the front wheels and all the coulters and press wheels, it has been found that by removing the coulters, problems arise due to the construction, for when the tyne jumps an obstruction or when excessive pressure is applied to the tyne forcing the tyne out of the ground, the press wheel is also lifted off the ground. This prevents the press wheel maintaining contact with and/or pressure on the ground and when the tyne jumps and the press wheel is lifted off the ground, the controlled depth of the seeding tyne point is lost in relation to the depth wheel which enables the tyne to penetrate deeper into the ground as it clears the obstruction.

It is an object of this invention to overcome the above problems.

BRIEF STATEMENT OF THE INVENTION

Thus there is provided according to the invention a trash seeder, in which the tyne and its frame are pivoted to a mian frame carrying the press wheel, the main frame being pivoted to a beam of the implement, a hydraulic cylinder applying pressure to the tyne which thus ensures that there is a downward pressure on the main frame press wheel when the tyne jumps over an obstruction.

BRIEF DESCRIPTION OF THE DRAWINGS

In order to more fully describe the invention, reference will be made to the accompanying drawings, in which.

DESCRIPTION OF THE PREFERRED EMBODIMENT

Figure 1:
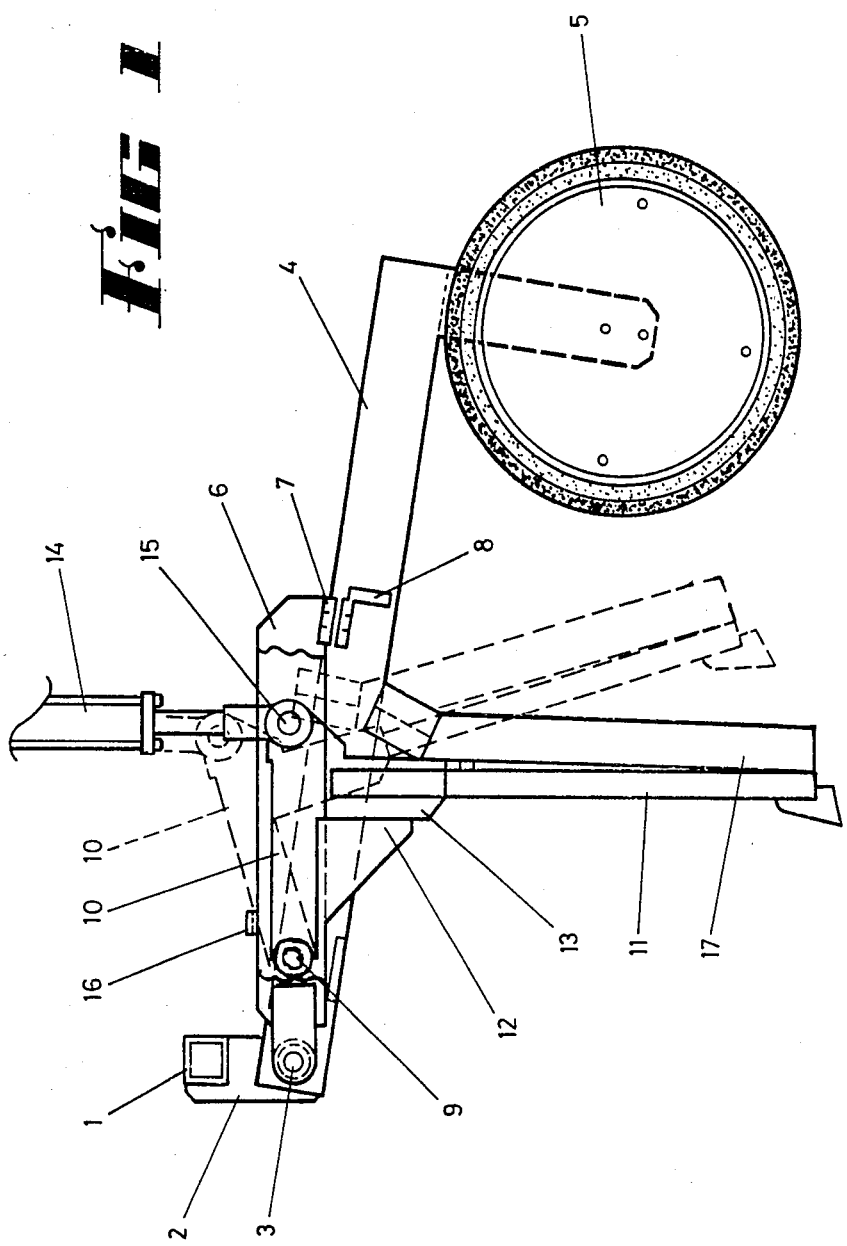
FIG. 1 is a side view, portion being broken away for clarity.
Figure 2:
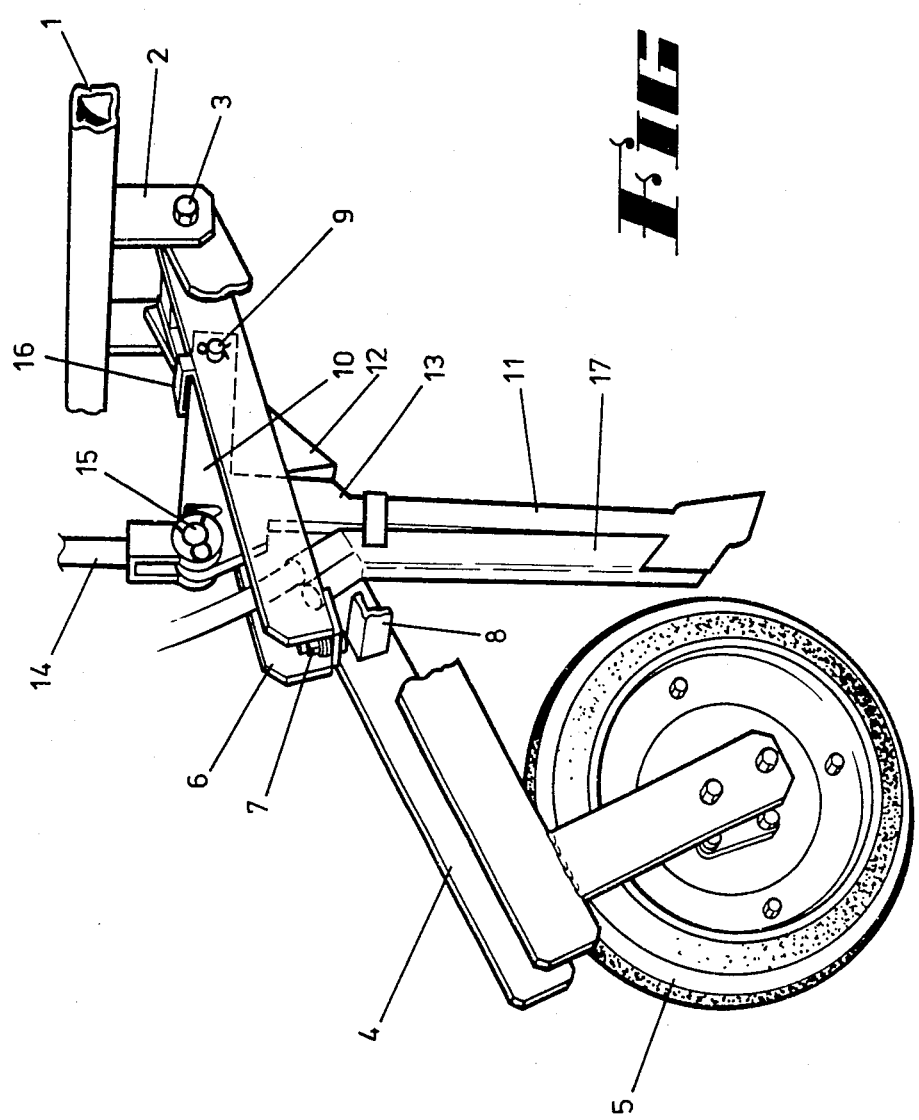
FIG. 2 is a perspective view thereof.

To the implement frame 1 there is attached a mounting member 2 to which is pivoted by pivot pin 3 a main frame 4 carrying a press wheel 5. Also pivoted to the pin 3 there is a second frame 6, the second frame 6 carrying depth adjustment members 7 to co-operate with depth stop members 8 on the main frame.

The second frame 6 carries a pivot pin 9 to which is pivotally attached a tyne frame 10 to which the tyne 11 is attached.

The second frame 6 carries a stop 12 against which the member 13 on the tyne 11 seats.

A hydraulic cylinder 14 is connected by pivot 15 to the end of the tyne frame.

Thus it will be seen that the tyne and tyne frame 10 can pivot about pivot 9 against the hydraulic cylinder when the tyne meets an obstruction to allow the tyne to jump clear of the ground while the press wheel maintains contact and pressure on the ground. This is due to the fact that as the hydraulic cylinder is connected to the tyne frame, which itself is pivoted to the second frame which then applies the force through the depth adjustment members onto the main frame carrying the press wheel.

A stop 16 mounted on the second frame 6 limits the upward movement of the tyne frame 10, but if a large obstruction is encountered, in order for the tyne 11 to clear the obstruction, the reaction, on the tyne frame 10 on the stop 16 will cause also the second frame to rise and also the press wheel if the obstruction is such a size as to encounter the press wheel.

However with the majority of obstructions encountered, the tyne will rise to clear the obstruction, it will pivot about pivot pin 9, while maintaining a downward pressure on the press wheel due to the reaction of the forces on the pivot 9 being applied to the second frame 6 which pivots about pivot 3 and thus to the press wheel on the main frame 4 and thus the press wheel is in contact with the ground at all times.

Thus it will be seen that as the tyne frame 10 is pivoted to the second frame 6 by pivot pin 9 spaced from the pivot pin 3 about which the second frame 6 pivots, the force applied by the hydraulic ram 6 forces the tyne frame 10 downwardly, and thus also the second frame 6 downwardly so that the members 7 and 8 force the main frame 4 and the press wheel 5 downwardly.

When the tyne 11 meets an obstruction, the tyne frame 10 can pivot upwardly against the pressure of the ram 14 without causing the press wheel 5 to lift. If a larger obstruction is encountered, then the tyne frame 10 will engage the members 16 on the secondary frame 6 to cause this frame to pivot upwardly about pivot pin 3 to allow the press wheel to raise and pass over the obstruction. The tyne can re-enter the soil while the press wheel passes over the obstruction.

It will be realised that the hydraulic ram may be connected hydraulically to an accumulator which is spring loaded, so that the hydraulic ram can raise against this pre-set loading, the displaced fluid being taken by the accumulator. Alternatively, a spring may be fitted instead of the hydraulic ram.

Also shown diagrammatically is a seeding tube 17 which can be attached behind the tyne 11.

Thus it will be seen that according to the invention there is provided a mechanism whereby the press wheel is in contact with the ground at all times even when the tyne rises to clear an obstruction, and thus the press wheel is effective in supporting the rear portion of the implement and also the attachment to the implement frame carrying the tyne and seeding boot.

Although one form of the invention has been described in some detail it is to be realised that the invention is not to be limited thereto but can include various modifications falling within the spirit and scope of the invention.

We claim:

1. A trash seeder comprising an implement frame carrying at least one seeding tyne, and a press wheel rearwardly of said seeding tyne, said press wheel being carried by a rigid main frame pivoted to said implement frame, said seeding tyne being pivoted rearwardly of said main frame pivot to a second frame pivoted to said implement frame, said second frame adapted to apply downward force to said rigid main frame, and resilient means applying downward pressure to said tyne, said seeding tyne being pivotable upwardly relative to said rigid main frame to clear an obstruction while downward pressure is maintained on said press wheel.

2. A trash seeder as defined in claim 1 characterized by said second frame being pivoted to said implement frame at the pivot of said main frame to said implement frame, and said tyne extends from a tyne frame pivoted to said second frame rearwardly of the pivot of said second frame to said implement frame, said resilient means comprising a hydraulic ram connected to said tyne frame remote from its pivot to said second frame.

3. A trash seeder as defined in claim 2 characterized in that said second frame engages the main frame whereby downward pressure applied to the tyne by the hydraulic ram is also applied to said main frame and said press wheel.

4. A trash seeder as defined in claim 3 characterized in that a stop is provided on said second frame to be engaged by upward movement of said tyne frame on the tyne encountering an obstruction, further movement of the tyne frame causing the second frame to move upwardly to allow the main frame to move upwardly to allow the press wheel to pass over the obstruction.

5. A trash seeder comprising an implement frame carrying at least one seeding tyne and a following press wheel, said press wheel being mounted on a trailing main frame pivoted to said implement frame by a pivot pin, a secondary trailing frame pivoted to said pivot pin, said secondary frame having means to engage said main frame, a trailing tyne frame pivoted at its forward end to said secondary frame by a second pivot pin spaced rearwardly of said first pivot pin, said tyne being carried by said tyne frame, a hydraulic ram connected to said tyne frame to apply downward pressure along said tyne frame, a stop on said secondary frame to engage by said tyne frame when said tyne frame pivots upwardly on the tyne striking an obstruction, the arrangement being such that the pressure of the hydraulic ram supplied to the tyne frame and also to the secondary frame due to the pivoting of the tyne frame to the secondary frame at a location spaced from the first pivot pin, the secondary frame applying pressure to the press wheel, the tyne frame being able to pivot upwardly without release of pressure on the press wheel until the tyne frame contacts said stop on the secondary frame when the secondary frame is also lifted allowing the press wheel to rise.

6. A trash seeder as defined in claim 5 characterized in that said means on said secondary frame to engage said main frame are adjustable to vary the vertical position of the press wheel.

7. A trash seeder comprising an implement frame carrying at least one stump jump seeding tyne and a press wheel rearwardly of said seeding tyne, characterized in that said press wheel is carried by a rigid main frame pivoted to said implement frame by pivot means, a second frame pivoted to said implement frame, said seeding tyne being pivoted to said second frame rearwardly of said pivot means, resilient means applying downward pressure on said tyne, said second frame adapted to apply downward pressure from said resilient means to said rigid main frame to apply downward pressure on said press wheel, said seeding tyne pivoting upwardly relative to said rigid main frame to clear an obstruction while downward pressure is maintained on said press wheel.

8. A trash seeder as defined in claim 7 characterized by said second frame being pivoted to said implement frame at the pivot of said main frame to said implement frame, and said tyne extends from a tyne frame pivoted to said second frame rearwardly of the pivot of said second frame to said implement frame, said resilient means comprising a hydraulic ram connected to said tyne frame remote from its pivot to said second frame.

9. A trash seeder as defined in claim 8 characterized in the said second frame engages the main frame whereby downward pressure applied to the tyne by the hydraulic ram is also applied to said main frame and said press wheel.

* * * * *